Figure 4:
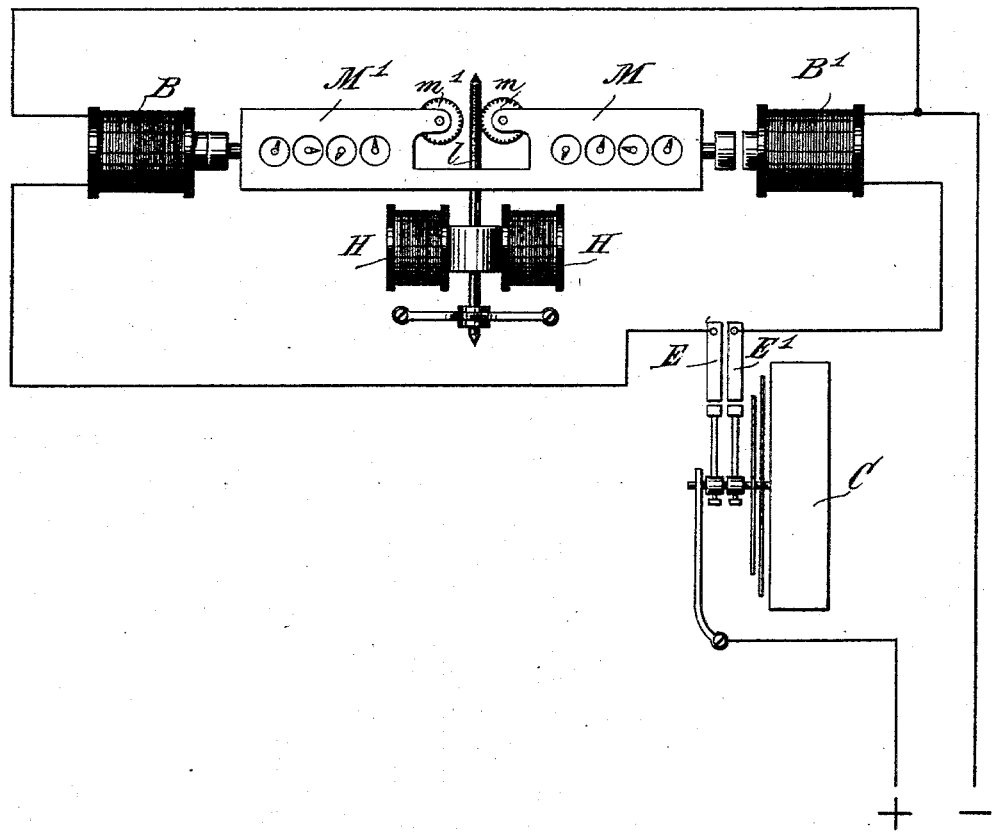

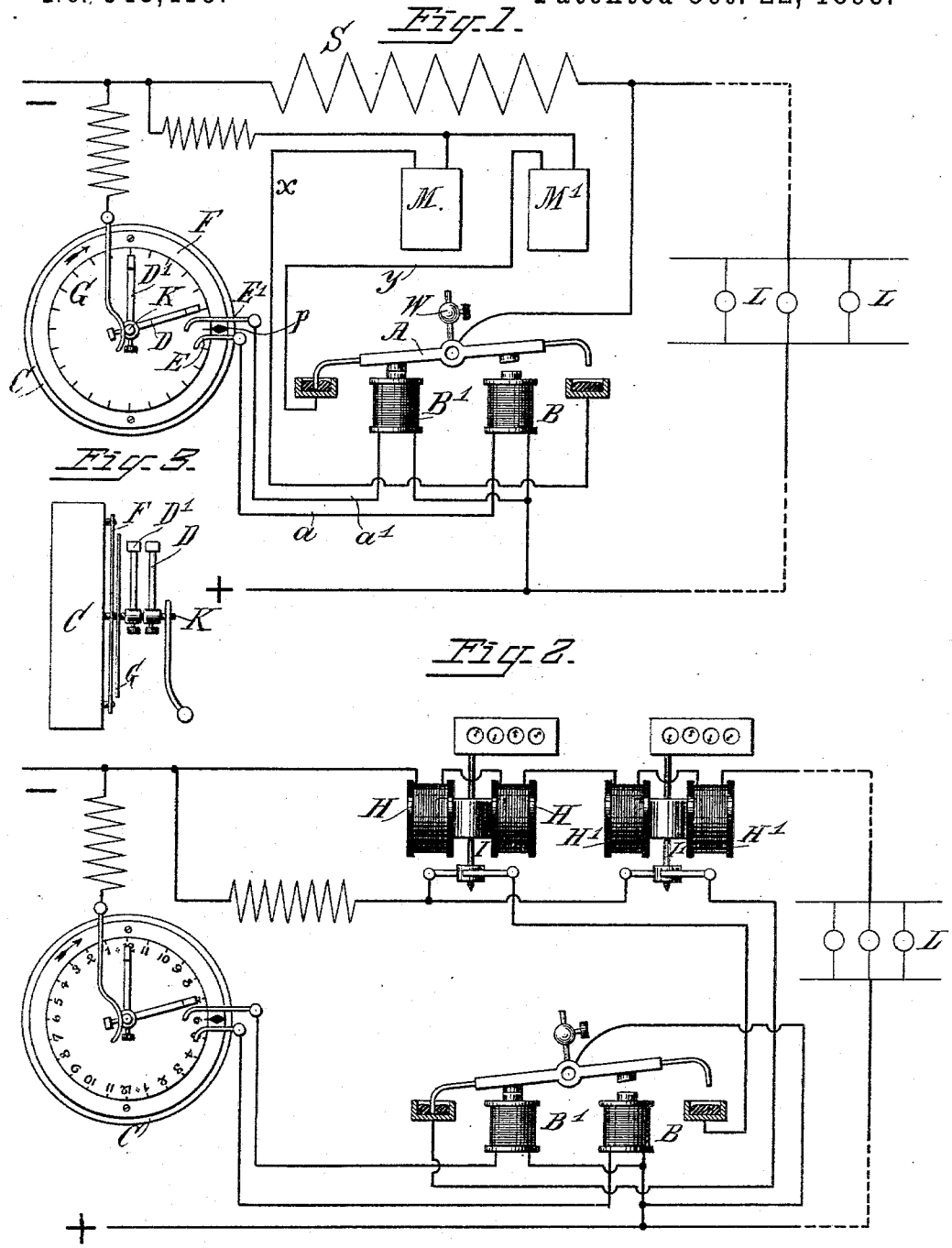

(No Model.) 2 Sheets—Sheet 2.

W. S. BARSTOW.
ELECTRIC METERING APPARATUS.

No. 548,419. Patented Oct. 22, 1895.

WITNESSES:

INVENTOR:
William S. Barstow.
ATTORNEY.

UNITED STATES PATENT OFFICE.

WILLIAM S. BARSTOW, OF BROOKLYN, NEW YORK.

ELECTRIC METERING APPARATUS.

SPECIFICATION forming part of Letters Patent No. 548,419, dated October 22, 1895.

Application filed April 6, 1895. Serial No. 544,714. (No model.)

*To all whom it may concern:*

Be it known that I, WILLIAM S. BARSTOW, a citizen of the United States, and a resident of Brooklyn, in the county of Kings and State of New York, have invented a certain new and useful Improved Electric Metering Apparatus, of which the following is a specification.

My invention relates to a novel electric metering apparatus; and it consists, essentially, in the combination, with an electric circuit or portion of circuit the current in which is to be measured, of two or more electric meters or devices giving independent readings, a clockwork or time-measuring device, and means controlled thereby for throwing said metering devices into operation in alternation and at predetermined times. When either of said metering devices is out of operation the other is in, so that at all times a registry is kept of the consumption of current; but the current registered by one during one or more predetermined periods may be charged for at a different rate from that registered by the other.

The metering apparatuses may be separate mechanisms throughout, or in the case of a mechanical meter the same driving-motor may be employed for two meter-trains and the latter be connected to the motor in alternation by any suitable device. The clockwork is preferably used in connection with suitable circuit-controllers, so as to operate as a time-switch that operates in any suitable manner to cause the circuit to be closed through one electric meter or means for connecting a meter-train to its motor, during certain hours, and during other hours through another electric meter or means for connecting the other registering-train to the meter.

The invention consists, further, in the special combinations of apparatus hereinafter described, and then specified in the claims.

One of the uses to which my invention may be put is as follows: In the operation of central stations there frequently occurs a period or periods when there is a small demand for the current, at which time the larger part of the machinery, &c., of the station is idle and does not earn its proportion of the fixed charges. In order to "even up" the demand for current, so that as much as possible of the machinery necessary to carry the maximum load can be utilized during the minimum, it is necessary to give some inducement to the consumer whereby he shall use the current during the above-named minimum periods. The inducement should come in the reduction in the price of current, so as to leave the net price cheaper than gas. The period during which such inducement is offered should be during the small load of the station, and will vary with the seasons of the year.

My invention affords a means of protecting the company by preventing the consumer using the low-price current during the hours of maximum load, thus increasing the necessary investment in machinery.

In the accompanying drawings, Figure 1 is a diagram illustrating my invention as carried out with an Edison or electrolytic meter. Fig. 2 is a diagram showing a way of carrying out the invention when a mechanical meter is used. Fig. 3 is a side elevation of the time-switch. Fig. 4 is a modification in which two meter-trains and one driving-motor are used.

In Fig. 1 L L are lamps or other translating devices in the circuit the use of current in which is to be measured. M M' are two Edison or other meters, and S a resistance by which a portion of the current passing to the work is shunted to the meters. Meters M M' are in independent shunts $x\,y$, which are closed in alternation by the operation of the clockwork C. A is a switch for closing the shunts $x\,y$ in alternation in obvious manner. The mechanical details it is unnecessary to describe. When one meter is out the other is in. Switch A is operated by magnets B B', and retains its position through the action of an overbalanced weight W. Magnets B B' are in circuits $a\,a'$, leading from springs E E' of a circuit-controller operated or governed by the clock, and closed at the time it is desired to transfer the readings of current used. D D' are circuit-closing arms secured to the hour-shaft K of clock C. Shaft K preferably is a twenty-four-hour shaft. The circuit is made in any desired way, as by a spring bearing on the shaft, and the arms are circumferentially adjustable on the shaft independently of one another and provided with set-screws for fixing each at the point desired. The arms are adapted to engage, respectively, with springs E E'. Preferably the two springs are in line with one another parallel to the clock-shaft, though shown out of line in the diagram for convenience of illustration. At $p$ is a fixed pointer or index coincident with the point at which the arms engage with the springs. G is a time-indicator disk adjustable around the shaft. The circuits closed by the arms are taken from any source of current. They are shown taken as a shunt of high resistance from the supply-circuit for the lamps L L. In use the disk G is turned until the hour of the day thereon at which the setting is made coincides with pointer $p$, and arms D D' are then set at times on G at which it is desired to transfer the readings of the current used. When D makes connection the meter M is thrown into action by magnet B throwing the switch A, and it remains in action until D' makes connection, when magnet B' throws the switch and brings in M', which continues to meter until D again makes connection. These devices are all merely designed to be typical of any clockwork or time switch and transfer mechanism controlled thereby for making the desired electrical or mechanical changes whereby the current may be registered on the meters in alternation and the transfer made at predetermined times. The adjustment of the arms provides for different conditions of maximum and minimum load in different stations or at different seasons of the year.

In Fig. 2 H H' are the field-coils of any mechanical meter, and I I' the armatures thereof, which are thrown into circuit in alternation in obvious manner. This meter is designed to be typical merely of motor-meters generally.

Another way of bringing metering devices into operation in alternation is shown in Fig. 4. In this case a motor common to two meter-trains is employed and mechanically shifted or switched from one train to the other, and vice versa, under the control of the clockwork, which may control the transfer in any desired way—as, for instance, through agencies similar to those employed for electric-switching of the meters in Figs. 1 and 2.

In Fig. 4 the driving-shaft of the motor works in fixed bearings and the magnets operate on armatures secured to the meter-train boxes, which are connected together and so mounted that the wheels $m\ m'$ of the meter-trains may be moved into and out of gear with the worm on shaft $l$ in obvious manner.

Other means, as will be obvious, might be used for putting the motor in mechanical connection with the registering or recording devices alternately without departing from my invention.

What I claim as my invention is—

1. The combination, substantially as described, with an electric circuit the consumption of current in which is to be measured, of a clock-work, two or more electric meters or devices giving independent readings, and means controlled by the clock-work for throwing said metering devices into operation in alternation and at predetermined times, as and for the purpose set forth.

2. The combination, substantially as described, of a clock-work, two independently adjustable circuit closing devices operated by the clock-work in alternation, a circuit or branch of circuit connected to each, and independent electric metering devices controlled respectively by said circuits and each arranged to measure the current used in the same circuit or portion of circuit.

3. The combination, substantially as described, with an electric metering apparatus having two independent meter trains, of a propelling motor, and a controlling clockwork for throwing said meter trains into connection with the motor in alternation.

4. The combination, substantially as described, of two independent registering devices of a propelling electric motor, a clockwork, and electrically controlled shifting mechanism governed by said clock and adapted to place the registering devices in connection with the motor in alternation and at predetermined times.

5. The combination with an electric circuit the current in which is to be measured, of independent registering or metering devices, a clock-work having circuit controllers adjustable independently of one another to close the circuit at different times, and means governed by said circuit controllers for bringing said metering devices into operation alternately, as and for the purpose described.

Signed at New York, in the county of New York and State of New York, this 4th day of April, A. D. 1895.

WILLIAM S. BARSTOW.

Witnesses:
WM. H. CAPEL,
HENRY T. HIRSCH.